Jan. 7, 1969  F. S. MILLER  3,420,052

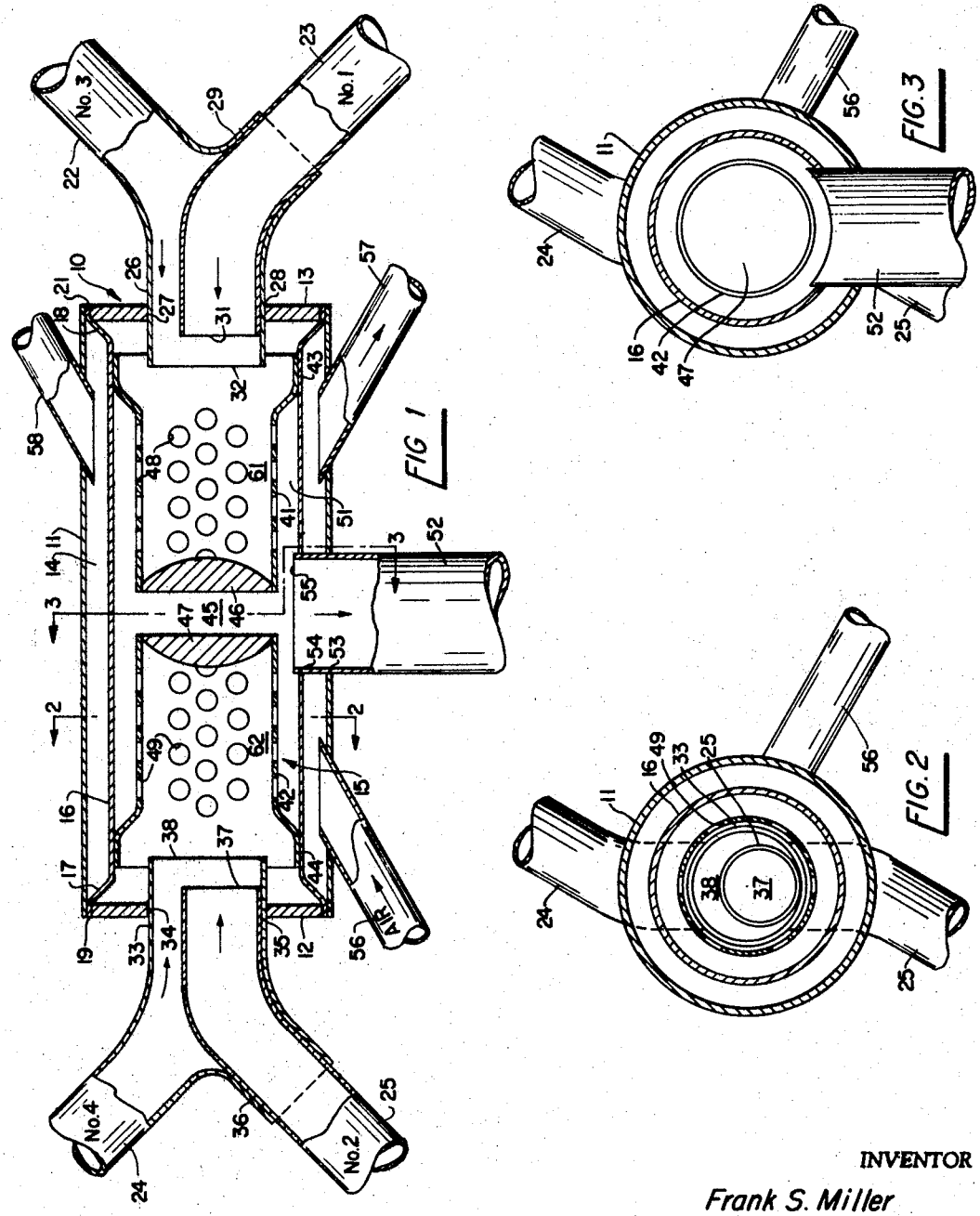
INVENTOR
Frank S. Miller

COMBINATION EXHAUST MUFFLER AND HEATER

Filed March 8, 1967  Sheet 2 of 2

INVENTOR
Frank S. Miller

BY Strauch, Nolan, Neale, Nix & Kurz
ATTORNEYS

United States Patent Office 3,420,052
Patented Jan. 7, 1969

3,420,052
COMBINATION EXHAUST MUFFLER AND HEATER
Frank S. Miller, Pittsburgh, Pa., assignor to North American Rockwell Corporation, a corporation of Delaware
Filed Mar. 8, 1967, Ser. No. 621,626
U.S. Cl. 60—31          10 Claims
Int. Cl. F01n 3/02; F01n 7/10; F01n 1/08

ABSTRACT OF THE DISCLOSURE

An exhaust muffler and air heater combination comprising a housing surrounding an annular high heat transfer inner wall to define an annular air heating space extending the length of the housing. The inner wall surrounds an exhaust gas chamber. A pair of exhaust pipes from the engine manifold each comprise a cylindrical pipe end fixed eccentrically within a larger diameter cylindrical pipe end concentrically fixed within a housing end wall plate. The pipe ends discharge hot gas according to the engine firing order into perforated side wall closed inner end baffle tubes that are fixed within the exhaust gas chamber independently of the pipe ends and the hot expanding gases pass through the baffle apertures and along the inner wall surface for optimum air warming heat transfer before discharge.

BACKGROUND OF INVENTION (a) *Field of invention.*—The invention pertains to exhaust muffler structure for four, six, eight and other even number cylinder internal combustion engines in automotive, agricultural, aircraft and other vehicles for reduced noise, efficient discharge of exhaust gases to atmosphere and for passing air in heat exchange contact with the exhaust gas passages for warming vehicle compartments and other devices.

(b) *Prior art.*—It has been proposed to provide combination exhaust muffler and air heater structures, as disclosed in Hannon Patent No. 3,043,098. Such prior structures have been found to involve undesirable disadvantages in manufacture, and operation is usually accompanied by a substantial amount of loss of engine horsepower due to high back pressures. This undesirable condition has been found to have been caused primarily by the nature of the gas flow through the plenum chamber of the muffler. As the hot exhaust gases enter the plenum chamber from the manifold pipes in accordance with the engine firing order each exhaust pulse tends to continue entirely through the plenum chamber and apply back pressure to the opposite inlet. Attempts have been made to remedy this condition by separating the plenum chamber into two separate chambers by an axial partition as in said Hannon patent, but this required the exhaust pipes to be deformed out-of-round to adapt to the separated plenum structure. An exhaust system of this type consisting of multiple out-of-round pipes jointed to plenum chamber end plates has been found to create a spring structure with characteristics which make it highly susceptible to fatigue or resonant vibration failure. Moreover, due to space limitations it was found necessary in these prior mufflers to project the manifold pipes a considerable distance within the plenum chamber to permit the provision of an adequate number of lateral discharge apertures without weakening the wall and to assure adequate radial expansion of the gases. This structural necessity further compounded the resonant vibration problem and impaired the noise suppressing characteristics of the muffler since that characteristic is influenced directly by the volume of the plenum chamber.

SUMMARY OF INVENTION

The invention comprises a muffler having a plenum chamber containing cylindrical laterally perforated baffle tube means extending substantially the entire length of the muffler and into which the engine cylinder exhaust pipes discharge at opposite open ends. The baffle tube means and the exhaust pipes are separately supported in the muffler housing, thereby providing rigidity of the assembly and vibrational control.

Paired telescoped engine cylinder exhaust pipe assemblies, in which each pair consist of a larger diameter outer cylindrical pipe conducting exhaust gases from one cylinder with a smaller diameter inner cylindrical pipe that conducts exhaust gases from another cylinder, extend only a small distance within the plenum chamber to assure availability of the entire plenum chamber volume for maximum noise suppression.

The novel "tube-in-tube" muffler configuration makes it possible to minimize flow restrictions to allow the exhaust gas to expand freely and continually during its passage.

Accordingly, it is a major object of the invention to provide an improved heater-muffler combination for an internal combustion engine which permits optimum use of the area available in the muffler plenum chamber to effect optimum exhaust gas flow conditions having controlled vibration and maximum noise suppressing characteristics.

A further object of the invention is to provide a novel heater-muffler structure wherein pairs of pipes from the engine manifold are rigidly mounted in the ends of the muffler housing to discharge into laterally perforated baffle tube means that are rigidly mounted on the muffler housing independently of said pipes and extend through an exhaust gas chamber that is surrounded by an annular air heating chamber. The invention contemplates several different baffle tube structures associated with the pipes all preventing undesirable through transmission of exhaust gas pulses within the muffler.

Another object of the invention is the provision of a novel "tube-in-tube" muffler exhaust pipe arrangement which provides a relatively rigid unit in respect to vibrational control and assures reduction in mechanical and thermal stresses due to elimination of sharp corners in the internal surfaces of the pipes.

A further object of the invention is the provision of a novel "tube-in-tube" arrangement at the inlet pipe sections to create an improved aspirator effect causing stagnant gases remaining in the adjoining pipe to be drawn into the plenum chamber.

Still another object of the invention is the provision of a muffler assembly having telescopically paired opposite inlet pipes in novel arrangement and in novel association a plenum chamber provided with cylindrical laterally perforated baffle tube means extending substantially the entire length of the plenum chamber to provide maximum wall area for the spacing of the perforations as dictated by the respective aero-dynamic needs without impairment of structural strength.

BRIEF DESCRIPTION OF DRAWINGS

FIGURE 1 is a side elevation mainly broken away and in section showing heater-muffler combination according to a preferred embodiment of the invention;

FIGURE 2 is a section substantially on line 2—2 of FIGURE 1 showing internal structure;

FIGURE 3 is a section substantially on line 3—3 of FIGURE 1 showing further internal structure;

PREFERRED EMBODIMENTS

Figure 4:
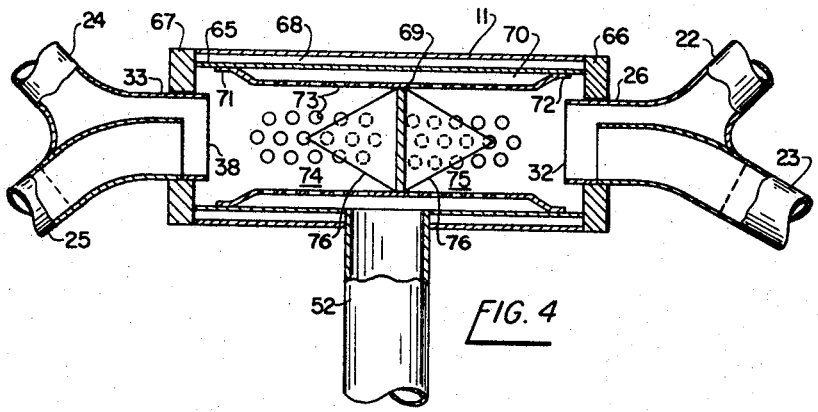
FIGURE 4 is a relatively schematic side elevation view mainly in section showing a heater-muffler combination according to a further embodiment of the invention.

In FIGURES 1 to 3, the heater-muffler combination assembly 10 comprises a tubular preferably cylindrical sheet metal housing 11 of uniform diameter having opposite ends closed by parallel end wall plates 12 and 13.

Internally housing 11 is separated into an outer annular air heating chamber 14 and an inner central exhaust gas plenum chamber 15 by a fixed concentric sheet metal tubular wall 16 having an intermediate portion of smaller diameter than housing 11 and outwardly flared ends 17 and 18 that extend between the inner periphery of housing 11 and the outer peripheries of plates 12 and 13 respectively. At opposite ends the housing, inner wall and end plates are permanently secured together in annular gas tight joints indicated at 19 and 21 in FIGURE 1. This may be done by a suitable brazing, soldering or welding operation.

For simplicity in illustration the invention is disclosed as applied to a four cylinder internal combustion engine (not shown), although it will be understood that it may be applied to engines having more than four cylinders.

The four exhaust manifold pipes 22, 23, 24 and 25, which are all of the same diameter, are connected to convey combustion gases from engine cylinders Nos. 1–4 respectively into the exhaust gas chamber 15. For example only the engine may have a firing order of 1-3-2-4. Exhaust pipe 22 from No. 3 cylinder has a larger diameter cylindrical and section 26 that extends through a central aperture 27 of end plate 13, the annular juncture 28 therebetween being sealed air tight as by brazing or welding.

Outwardly of plate 13, exhaust pipe 23 from No. 1 cylinder extends gas tight through an angular branch 29 of pipe 22 to terminate within the enlarged pipe section 26 in a circular opening 31 that is eccentric to the circular opening 32 of pipe section 26. Thus gas inlet opening 32 at one end of chamber 15 is common to both exhaust pipes 22 and 23.

Similarly, outwardly of plate 12, exhaust pipe 24 from No. 4 cylinder has a larger diameter cylindrical end section 33 that extends through a central aperture 34 in plate 12, the annular juncture 35 therebetween being gas tight as by welding or brazing. Also outwardly of plate 12, exhaust pipe 25 from No. 2 cylinder extends through an angular branch 36 of pipe 24 to terminate within enlarged section 33 of pipe 24 in a circular opening 37 that is eccentric to the circular opening 38 of pipe section 33. Thus gas inlet opening 37 at the other end of chamber 15 is common to both exhaust pipes 24 and 25. The effective areas of gas inlet opening for all of the exhaust pipes 22–25 are preferably equal.

Within exhaust gas chamber 15 are fixedly mounted two identical smaller diameter tubular cylindrical baffle tubes 41 and 42 that have flared outer ends 43 and 44 permanently secured as by brazing or welding within the inner periphery of wall 16. These baffles 41 and 42 are concentric with wall 16 and each other, and their flared outer circular ends are concentric with exhaust pipe openings 32 and 38 respectively. The inner ends of baffles 41 and 42 are longitudinally separated by an axially short chamber space 45, and are closed by imperforate plugs 46 and 47 respectively. Baffles 41 and 42 are formed with a plurality of apertures 48 and 49 respectively in their peripheries providing fluid communication between the interior thereof and the substantially cylindrical annular region 51 of the exhaust gas chamber that surrounds the baffles inwardly of wall 16.

Baffles 41 and 42 combine to extend substantially the effective length of gas chamber 15, and apertures 48 and 49 are of such size, distribution and spacing that there is substantially uniform laterally outward discharge of the expanding gas all along the gas chamber. The incoming exhaust gas is allowed to expand rapidly to prevent excess pressure build-up within the muffler and to reduce the noise level. The aperture spacing is adequate to insure that the baffle tubes remain rigid in operation.

An exhaust gas discharge pipe 52 extends through aperture 53 in the side of housing 11 and aperture 54 in the side of wall 16 to terminate in circular opening 55 within exhaust gas chamber 15. If installation requirements permit, pipe 52 is preferably disposed equidistant from plates 12 and 13 and the gas inlet openings 32 and 38 to insure full use of the available exhaust gas chamber space for maximum noise suppression and optimum gas flow conditions.

Where the muffler is to be used as an air heater, air inlet and outlet pipes 56 and 57 respectively project gas tight through housing 16 into the cylindrical annular air heating chamber 14 between the wall 16 and housing 11 that is gas tight with respect to the exhaust gas chamber, and pipe 57 is connected to a usual heater unit (not shown). Pipe 56 is open to atmosphere through a suitable filtering arrangement. Wall 16 is preferably of thin sheet metal or other such material having very high heat conductivity for optimum transfer of heat from exhaust gas chamber 15 to air heating chamber 14.

A second hot air outlet pipe 58 may also extend into chamber 14, as for extracting hot air to supply another heater, warm a carburetor or the like and prevent icing.

The air outlet pipes open into the chamber 14 remote from inlet pipe 56, to insure that the entering cool air encounters as much area of heat transfer wall 16 as possible before leaving chamber 14.

In operation, the firing order being 1-3-2-4, it will have been seen that exhaust gas flow from the engine to the muffler assembly will consecutively alternate between discharges from the respective cylinders into the baffle chambers 61 and 62 thereby balancing the mechanical forces incident to pressure changes.

Pipes 23 and 25 are preferably fixed rigidly along their lower regions as by welding to the respective coextensive portions of manifold sections 26 and 33, and they terminate sufficiently inwardly that gases are discharged therefrom linearly of the muffler. The exhaust pipe structure and mounting at each end of the muffler is thus rigid to reduce vibration and noise.

The exhaust gases enter the muffler at relatively high velocities and rapidly expand within the baffle chambers from which they are radially outwardly expelled through apertures 48 and 49 into contact with wall 16. The entering gases are prevented from longitudinally continuing through the entire muffler by baffle end plugs 46 and 47 which effectively block further linear gas flow towards the opposite ends of the muffler, thus preventing any undesirable back pressure with subsequent loss of engine power to the opposite exhaust inlet pipes.

Thus the entering exhaust gases are compelled to discharge radially outwardly through apertures 48 and 49 and to impinge substantially perpendicularly upon and over the entire inner surface of heat transfer wall 16, for maximum heat transfer to air heating chamber 14.

Since the inlet ends of the exhaust pipes at the muffler are all cylindrical throughout there is no transitional change of cross section, and this provides optmium structural rigidity and optimum gas flow conditions.

By elimination of cross sectional changes in the exhaust pipes, flow restrictions are considerably minimized and optimum gas flow conditions exist. The creation of concentrated mechanical and/or thermal stresses is eliminated by the omission of sharp bends in the walls of the pipes.

The effective equal gas discharge inlet areas at each end insures that equal volumes of gas are successively discharged into the baffles from each cylinder. Since the exhaust pipes extend only a relatively short distance into the respective baffle chambers, optimum use of the area available at the ends of chamber 15 is permitted. Since the perforated baffle tubes 41 and 42 are separately mounted within chamber 15 and are not directly connected to the gas inlet pipes, these pipes are subjected only to linear gas flow force reactions and are not disturbed by reaction and vibration forces caused by gas flow diversion which are encountered where perforated exhaust pipe ends extend directly into the exhaust gas chamber as in some prior devices.

Thus, with the novel construction of the invention wherein the exhaust gas inlet pipes terminate at the ends of the muffler the entire exhaust chamber area within wall 16 is available for rapid expansion of the exhaust gases for optimum gas flow conditions along the inner surfaces of heat transferring wall 16 and for maximum noise level suppression without introducing adverse vibrational forces into the pipes.

A further considerable beneficial effect of the foregoing "tube-in-tube" gas inlet pipe construction is obtained by the scavenging action provided by alternate gas flow through the exhaust pipes. By the disclosed exhaust pipe end arrangement, a compact aspirator is provided in which the maximum differential in exhaust gas velocity between each associated pair of pipes 22, 23 and 24, 25 is available for scavenging. For example, exhaust gas flow through pipe 24 when No. 4 cylinder is fired tends, due to its high velocity passing pipe opening 37, to scavenge any stagnant gas remaining in associated pipe 25 and draw it along into baffle chamber 62. This aspiration condition, of course, scavenges pipe 24 upon firing of No. 2 cylinder. The foregoing scavenging action helps to reduce back pressure. The velocity differential between associated pipes may be controlled for scavenging by changing the effective length that pipe 23 (or 25) extends within the associated enlarged pipe 26 (or 33), or by varying the relative pipe diameters.

Considering operation of the arrangement of FIGURES 1 to 3 in detail and, as an example, with an engine firing order 1-3-2-4, when No. 1 cylinder is fired, hot exhaust gases therefrom are propelled through pipe 23 into the muffler. Due to the high velocity of the exhaust gas pulse through pipe 23 and the tuned distance between the open end 31 of pipe 23 and the open end 32 of pipe 26 an aspiring action is created to scavenge stagnant gas from pipe 22. When the exhaust gas enters chamber 61 it expands due to the larger volume of the baffle chamber. The closed inner baffle end pervents gas pulses from continuing straight through chamber 15 and thus prevent any application of back pressure to the opposite gas inlet pipes, and instead compel the expanding gas to discharge radially outwardly through the baffle apertures until it contacts and flows over the entire inner surface of the heat transfer wall 16 to achieve the full effect of the gas total temperature for heating air or other fluid circulating through chamber 14. The accompanying further expansion of the gas within chamber 15 after leaving the baffle generates a vigorous forced convection of the gas as it flows towards discharge pipe 52. Due to the foregoing construction vibration caused by the expansion of the gas and flow diversion are reduced to a minimum. Due to the concentric arrangement of the perforated baffles and the surrounding wall within the muffler housing 11 maximum noise level suppression is obtained.

Next in order to fire is No. 3 cylinder, whoes gas flows through pipe 22. Here, the high velocity gas flow through pipe 22 into pipe 26 and over the open end 31 of pipe 23 scavenges the stagnant gases from pipe 23.

Following the gas expansion into chamber 15, as a result of the gas flow through pipes 22 and 23, a vigorous forced convection of the gases toward discharge pipe 52 through surface 55, additionally assists in removing the stagnant gases from the opposite inlets, pipes 24 and 25.

Next in order to fire is No. 2 cylinder, the exhaust pipe 25 of which is connected into the opposite end of the muffler. Due to the high velocity of the exhaust gas pulse through pipe 25 and the tuned distance between open end 37 of pipe 25 and the open end 38 of pipe 33 an aspirating action is created to scavenge stagnant gases from pipe 24. When the exhaust gas enters chamber 62 it expands due to the larger volume of the baffle chamber. Due to the closed inner baffle end, the resulting action is the same as previously described for the opposite inlet.

Next in order to fire is No. 4 cylinder whose gas flows through pipe 24. Here, the high velocity gas flow, through pipe 24 into pipe 33 and across open end 37, scavenges the stagnant gas from pipe 25.

Following the gas expansion into chamber 15, resulting from the gas flows through pipe 24 and 25, a vigorous forced convection of the gas toward discharge pipe 52 through surface 55 additionally assists in removing the stagnant gases from the opposite inlets, pipes 22 and 23.

Thereafter, the foregoing cycle is continually repeated. Due to the foregoing construction, vibration, caused by the expansion of the gas and flow diversion, is reduced to a minimum. Due to the concentric arrangement of the perforated baffle and the surrounding wall within the muffler housing 11, maximum noise level suppression is obtained.

FIGURE 4 illustrates an embodiment wherein housing 11 surrounds the radially spaced inner cylindrical heat transfer wall 65 and both the housing and wall are secured to opposite end plates 66 and 67 to form the annular gas tight air heating chamber 68. Wall 65 surrounds the exhaust gas chamber 70. The essential differences over FIGURES 1–3 are that the baffle structure within the exhaust gas chamber here comprises a single sheet metal cylindrical tube 69 concentric with but of smaller diameter than wall 65 having enlarged open ends 71 and 72 secured gas tight as by welding to the inner periphery of wall 65 near the end plates, the side of tube 69 is formed with a number of apertures 73 and the interior of tube 69 is axially divided into equal size baffle chambers 74 and 75 by identical, back to back arranged, cone shaped dividers 76 disposed midway longitudinally of the tube. The opposite open ends of tube 69 are concentric with the enlarged inlet end openings of the exhaust pipe structures which are the same and pass through the supporting end plates as in FIGURES 1–3.

Figure 5:
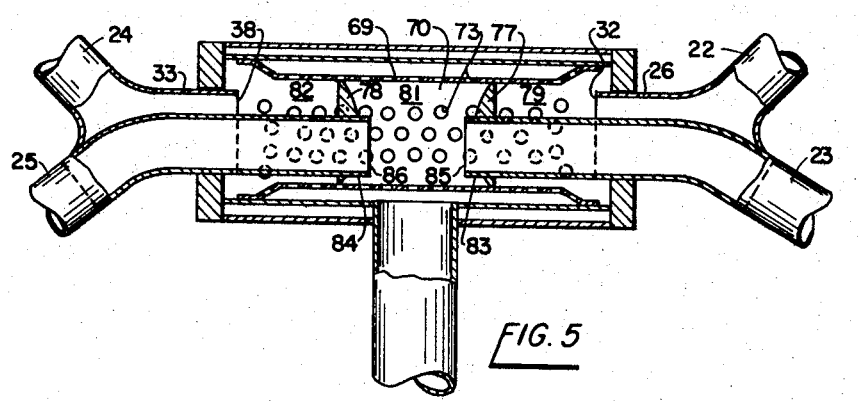
FIGURE 5 is a relatively schematic side elevation view mainly in section showing a heater-muffler combination according to still another embodiment of the invention.

In the embodiment of FIGURE 5, tube 69 is the same as in FIGURE 4, but the interior of tube 69 is separated by sealed plugs 77 and 78 into three baffle chambers 79, 81 and 82. The end plate supported enlarged end sections 26 and 33 of exhaust pipe 22 and 24 are of the same length and size as in FIGURES 1–4 and are concentrically fixed in the end plates to discharge gases into the end chambers 79 and 82. The inner ends 83 and 84 of pipes 23 and 25 in this embodiment extend through plugs 77 and 78 to terminate in equal area circular end openings 85 and 86 to discharge oppositely into baffle chamber 81. This arrangement aids in reducing back pressure.

The heater muffler combination structure in all embodiments achieves maximum noise level suppression and back pressure reduction to allow the engine to operate at peak capacity. The concentric arrangement of the outer and inner housing walls further enhances the muffling characteristics and makes it possible to use the entire heat energy of the exhaust gases to heat air or some other fluid for a useful purpose.

Because of the efficiency of its geometry, the structure of the invention permits the use of substantially the entire exhaust gas chamber for muffling, and it minimizes flow restrictions. The exhaust gas is allowed to expand continually during its passage and separation of support of the cylindrical baffle structure from the exhaust pipe structure reduces vibration, as well as providing a less expensive structure.

The present invention may be embodied in certain other forms without departing from the spirit and essential characteristics thereof, therefore, the present embodiments are to be considered in all respects as illustrative only and not restrictive, the scope of the invention being indicated by the appended claims rather than by the foregoing description.

What is claimed and desired to be secured by Letters Patent is:

1. In a muffler assembly of the type wherein a housing contains an exhaust gas chamber surrounded by an internal heat exchange wall and pairs of engine manifold pipes extend through opposite end walls of said housing to discharge hot exhaust gases into said chamber, means fixedly securing said pipes to said end walls, and internal baffle tube means of smaller diameter than said inner wall fixedly secured to said housing independently of said pipes to extend longitudinally within said chamber and having open ends disposed to directly receive gas from said pipes, said baffle tube means being laterally apertured for discharge of said gas into contact with said inner wall.

2. In the muffler assembly defined in claim 1, said pipes being cylindrical where they extend through said end walls, and said baffle tube means being cylindrical.

3. In the muffler assembly defined in claim 1, said baffle tube means being rigidly secured to said internal wall near said end walls.

4. In the muffler assembly defined in claim 1, means in said housing defining an annular air heating chamber surrounding said inner wall.

5. In the muffler assembly defined in claim 1, each said pair of pipes comprising a first exhaust manifold pipe connected to a cylinder of said engine and having an enlarged cylindrical end secured in a housing end wall and terminating within said chamber in a circular opening concentric with said tubular baffle means, and a second exhaust manifold pipe rigid with said first pipe extending through the side of said first pipe to terminate in a circular opening of smaller diameter than and eccentric to the circular opening of said enlarged pipe section.

6. In the muffler assembly defined in claim 5, said second circular opening being disposed within said enlarged pipe end.

7. In the muffler assembly defined in claim 5, said tubular baffle means comprising two cylindrical laterally perforated closer inner end tubes concentric with said enlarged pipe ends and independently fixedly mounted within said housing.

8. In the muffler assembly defined in claim 5, said tubular baffle means comprising a single laterally perforated tube having open ends adjacent said enlarged pipe end openings.

9. In the muffler assembly defined in claim 8, an imperforate transverse wall across said tubular baffle means separating it into baffle chambers, one for each pair of manifold pipes.

10. In the muffler assembly defined in claim 8, two longitudinally spaced imperforate walls across said baffle tube separating it into two end baffle chambers open to the respective enlarged pipe ends and an intermediate baffle chamber, the end of each smaller diameter manifold pipe extending through one of said baffle walls to open into said intermediate baffle chamber.

References Cited

UNITED STATES PATENTS

| | | | |
|---|---|---|---|
| 2,361,133 | 10/1944 | Sprouse | 181—54 |
| 2,541,973 | 2/1951 | Wiegman | 60—29 |
| 2,618,355 | 11/1952 | Hedrick | 181—36.4 |
| 2,833,368 | 5/1958 | Lowther | 181—40 |
| 2,878,888 | 3/1959 | Abarth | 181—36.4 |
| 2,940,249 | 6/1960 | Gospodar | 60—32 |
| 3,043,098 | 7/1962 | Hannon | 60—31 |
| 3,189,122 | 6/1965 | Martin | 181—56 |
| 3,375,898 | 4/1968 | Von Hoevel | 181—56 XR |

WENDELL E. BURNS, *Primary Examiner.*

U.S. Cl. X.R.

60—29; 181—36, 40, 49, 54, 63